United States Patent
May et al.

(10) Patent No.: US 9,175,474 B2
(45) Date of Patent: Nov. 3, 2015

(54) APPARATUS FOR ATTACHING A MEMBER TO A CORE-STIFFENED STRUCTURE AND A COMBINATION THEREOF

(75) Inventors: Carl A. May, Mansfield, TX (US); James D. Hethcock, Jr., Colleyville, TX (US); John R. McCullough, Weatherford, TX (US); Ronald K. Cox, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/521,397

(22) PCT Filed: Feb. 2, 2011

(86) PCT No.: PCT/US2011/023455
§ 371 (c)(1),
(2), (4) Date: Jul. 10, 2012

(87) PCT Pub. No.: WO2011/097283
PCT Pub. Date: Aug. 11, 2011

(65) Prior Publication Data
US 2012/0284970 A1    Nov. 15, 2012

Related U.S. Application Data

(60) Provisional application No. 61/301,692, filed on Feb. 5, 2010.

(51) Int. Cl.
*E04B 1/38* (2006.01)
*E04C 2/36* (2006.01)
*F16B 5/01* (2006.01)

(52) U.S. Cl.
CPC . *E04C 2/365* (2013.01); *F16B 5/01* (2013.01); *Y10T 24/33* (2015.01)

(58) Field of Classification Search
CPC ...... F16B 5/01; F16B 19/1081; F16B 13/141; F16B 21/084; F16B 21/086; F16B 37/043; F16B 12/26; F16B 19/008; F16B 37/0842; F16B 5/02; F16B 5/0614; F16B 5/0642; F16B 5/065; F16B 5/0657; F16B 13/0808; F16B 13/12; F16B 17/006; F16B 21/06; F16B 29/00; F16B 33/006; F16B 37/045; F16B 37/067; F16B 37/122; F16B 37/125; F16B 5/0216; F16B 5/0225; F16B 5/0233; F16B 5/04; F16B 5/0628; F16B 5/0664; F16B 5/0685; F16B 5/126; F16B 5/128; Y10T 24/309; Y10T 24/44026; Y10T 24/42; Y10T 24/30; Y10T 428/24149; Y10T 403/53; Y10T 156/1062; Y10T 16/05; Y10T 24/303; Y10T 24/33; Y10T 24/3685; Y10T 24/44274; Y10T 24/45105; Y10T 24/45602; Y10T 29/4992; Y10T 29/49943; Y10T 29/49957; Y10T 29/49966; E04C 2/365
USPC ............................ 24/289, 291, 292, 297, 458
See application file for complete search history.

(56) References Cited

U.S. PATENT DOCUMENTS 2,607,447 A * 8/1952 Tuttle .......................... 52/787.12
3,579,942 A * 5/1971 Cole ........................... 52/787.12
(Continued)

FOREIGN PATENT DOCUMENTS

| DE | 102008024321 A1 | 11/2009 |
| WO | 93012344 A1 | 6/1993 |
| WO | 2008091347 A1 | 7/2008 |

OTHER PUBLICATIONS

International Search Report and the Written Opinion of the International Searching Authority mailed by ISA/USA, U.S. Patent and Trademark Office on Jun. 13, 2011 for International Patent Application No. PCT/US11/23455, 14 pages.

(Continued)

*Primary Examiner* — Robert J Sandy
*Assistant Examiner* — David Upchurch
(74) *Attorney, Agent, or Firm* — James E. Walton

(57) ABSTRACT

An apparatus for attaching a member to a honeycomb core-stiffened structure includes a body and one or more elements extending from the body configured to be adhesively bonded to one or more walls of a honeycomb core of the honeycomb core-stiffened structure. The apparatus further includes a fitting for attaching the member to the apparatus. A honeycomb core-stiffened structure includes a honeycomb core and an apparatus for attaching a member to the honeycomb core. The apparatus includes a body and one or more elements extending from the body configured to be adhesively bonded to one or more walls of the honeycomb core of the honeycomb core-stiffened structure. The apparatus further includes a fitting for attaching the member to the apparatus.

11 Claims, 9 Drawing Sheets

(56) References Cited

U.S. PATENT DOCUMENTS

| | | | | |
|---|---|---|---|---|
| 4,270,328 A | * | 6/1981 | Page et al. | 52/511 |
| 4,370,372 A | * | 1/1983 | Higgins et al. | 428/116 |
| 4,650,261 A | * | 3/1987 | Winter et al. | 312/140 |
| 4,720,770 A | * | 1/1988 | Jameson | 361/705 |
| 4,744,612 A | * | 5/1988 | Winter et al. | 312/140 |
| 4,817,264 A | * | 4/1989 | Worthing | 29/512 |
| 4,878,791 A | * | 11/1989 | Kurihara et al. | 411/55 |
| 4,890,966 A | * | 1/1990 | Umezawa | 411/340 |
| 5,093,957 A | * | 3/1992 | Do | 16/2.1 |
| 5,291,639 A | * | 3/1994 | Baum et al. | 24/297 |
| 5,496,006 A | * | 3/1996 | Kulka et al. | 248/231.9 |
| 5,540,528 A | * | 7/1996 | Schmidt et al. | 411/55 |
| 6,345,420 B1 | * | 2/2002 | Nabeshima | 24/297 |
| 6,431,585 B1 | * | 8/2002 | Rickabus et al. | 280/728.3 |
| 6,837,659 B2 | * | 1/2005 | Oberkofler | 411/82.1 |
| 7,198,315 B2 | * | 4/2007 | Cass et al. | 296/29 |
| 7,305,799 B2 | | 12/2007 | Smelser et al. | |
| 7,870,648 B2 | * | 1/2011 | Schaty | 24/297 |
| 2003/0019086 A1 | * | 1/2003 | Allie | 24/458 |
| 2003/0152438 A1 | * | 8/2003 | Oberkofler | 411/82 |
| 2004/0071503 A1 | * | 4/2004 | Jones et al. | 403/267 |
| 2004/0177573 A1 | * | 9/2004 | Newhouse et al. | 52/239 |
| 2006/0239824 A1 | | 10/2006 | Robertson et al. | |
| 2008/0023972 A1 | * | 1/2008 | Ohno et al. | 293/155 |
| 2008/0116094 A1 | * | 5/2008 | Truong et al. | 206/338 |
| 2008/0213034 A1 | * | 9/2008 | Wood et al. | 403/122 |
| 2008/0302060 A1 | | 12/2008 | Ciprian | |
| 2009/0218445 A1 | * | 9/2009 | Wood | 244/131 |
| 2009/0293421 A1 | * | 12/2009 | Erickson et al. | 52/787.12 |
| 2010/0026028 A1 | * | 2/2010 | Smith et al. | 296/29 |
| 2010/0162537 A1 | * | 7/2010 | Shiba | 24/458 |

OTHER PUBLICATIONS

Chinese Office Action in related Chinese patent application No. 201180009223.9, 6 pages, mailed Dec. 16, 2013.

Extended European Search Report in related European patent application No. 11740291, 7 pages, mailed Dec. 5, 2013.

Canadian Office Action in related Canadian patent application No. 2,787,421, 3 pages, mailed Dec. 23, 2013.

* cited by examiner

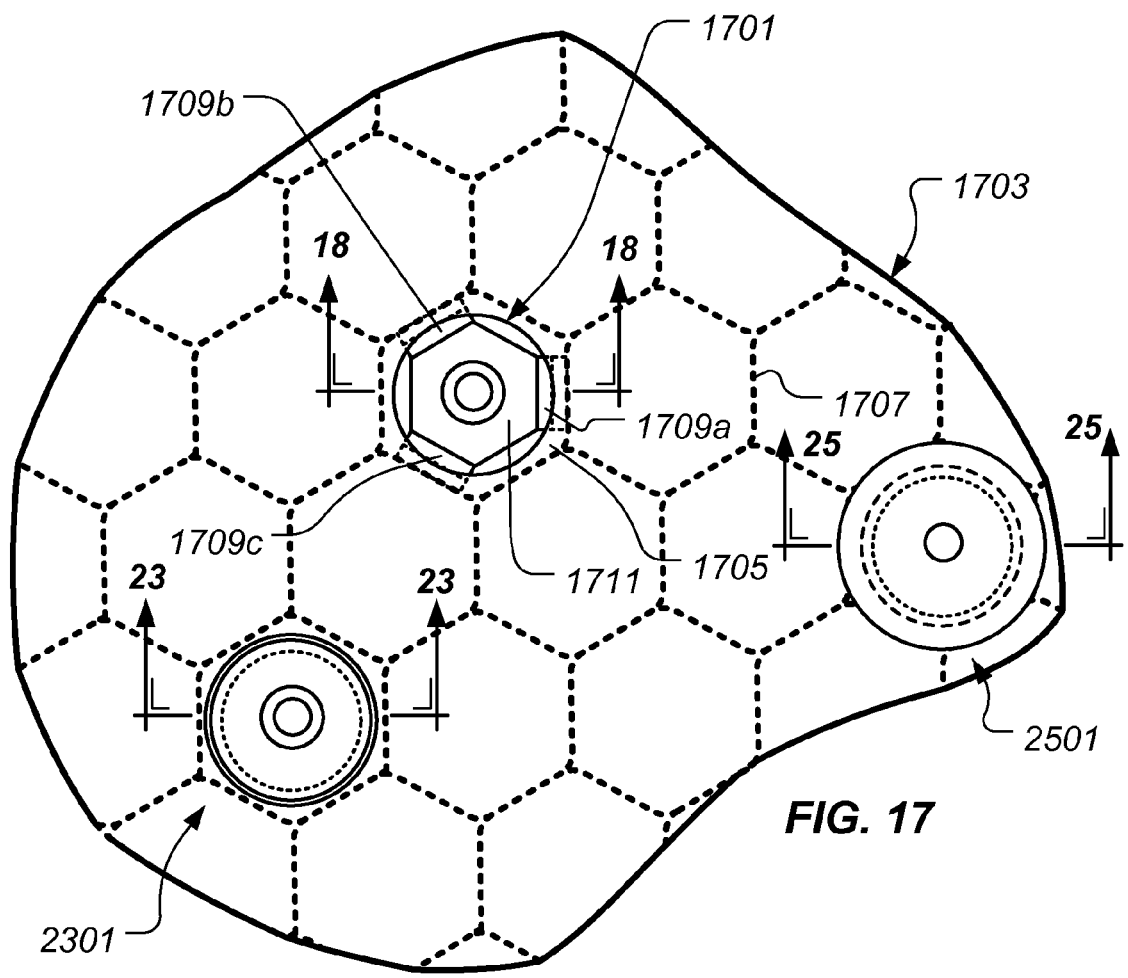
FIG. 17
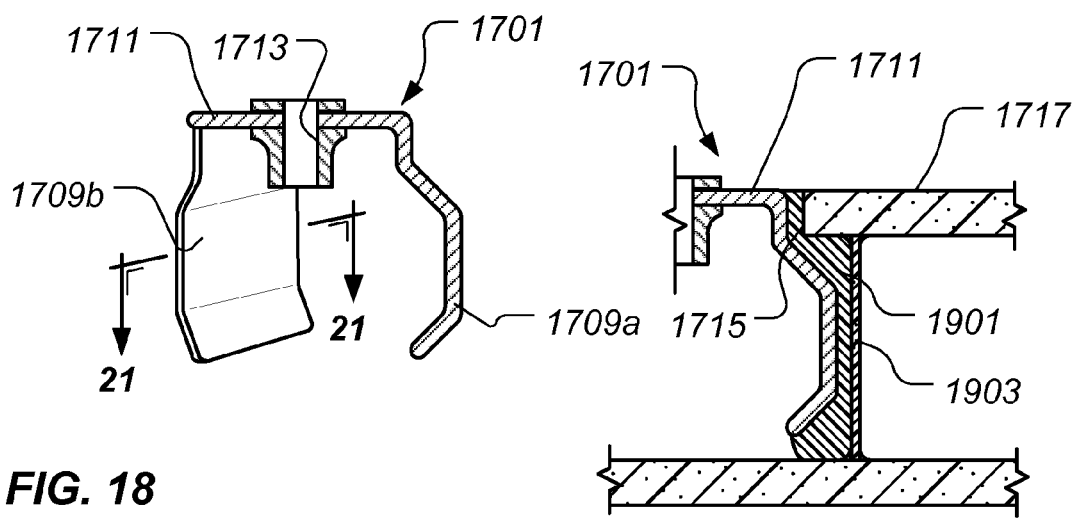
FIG. 18
FIG. 19 ically sufficient to retain the pads on panel 101. Moreover, the quality of the adhesive bond between the pads and panel 101 is adversely affected by improper preparation of panel 101 where the pads are to be attached.

APPARATUS FOR ATTACHING A MEMBER TO A CORE-STIFFENED STRUCTURE AND A COMBINATION THEREOF

TECHNICAL FIELD

The system of the present application relates in general to the field of honeycomb core-stiffened composite structures.

DESCRIPTION OF THE PRIOR ART

Composite structures or panels often comprise honeycomb core disposed between and adhesively bonded to an inner skin and an outer skin. Such structures are desirable due to their high strength-to-weight ratio. It is often necessary to attach members, such as clips and the like, to honeycomb-stiffened structures. Accordingly, various attachment devices exist to affix members to honeycomb-stiffened composite structures.

FIG. 1 depicts a honeycomb-stiffened composite panel 101 comprising a honeycomb core, such as a honeycomb core 201 of FIG. 2, disposed between and adhesively bonded to an inner skin 103 and an outer skin 105. One way of attaching members to panel 101 is to adhesively bond a pad 107 or 109 to panel 101. Pad 107 includes a female threaded element 111 and pad 109 includes a male threaded element 113. Elements 111 and 113 are used to attach the member to pad 107 or 109, respectively. Except for elements 111 and 113, pads 107 and 109 are the same. Pads 107 and 109, however, are retained on panel 101 solely by the adhesive bond between pad 107 or 109 and panel 101. Thus, the adhesive bond between the pads, i.e., pads 107 and 109, and panel 101 may not be mechanically sufficient to retain the pads on panel 101. Moreover, the quality of the adhesive bond between the pads and panel 101 is adversely affected by improper preparation of panel 101 where the pads are to be attached.

Referring now to FIGS. 2 and 3, another way of attaching a member to a honeycomb-stiffened composite panel, such as panel 203, is through the use of a "potted insert." Note that in FIG. 2, a portion of an inner skin 205 of panel 203 has been removed for clarity. A portion of honeycomb core 201 is removed and replaced with a threaded insert 207. Threaded insert 207 is "potted" in place using an adhesive portion 209. While this way of attaching members to panel 203 is effective, the weight added to panel 203 by adhesive portion 209 is often significant and undesirable in weight-sensitive applications.

Referring now to FIG. 3, a member may be attached to panel 203 by providing an attachment apparatus 301 that extends through panel 203. Core 201 is locally filled with an adhesive portion 303. A hole 305 is drilled through inner skin 205, adhesive portion 303, and an outer skin 307 of panel 203. Outer skin 307 provides a recess 309. A threaded rod 311 is attached to an inner element 315. Outer element 313 is disposed in recess 309 and threaded rod 311 is disposed through hole 305. An inner element 315 is threadedly engaged with rod 311 to affix apparatus 301 to panel 203. While this way of attaching members to panel 203 is effective, the weight added to panel 203 by adhesive portion 303 and apparatus 301 is often significant and undesirable in weight-sensitive applications.

There are many devices for and ways of attaching members to honeycomb core-stiffened composite panels well known in the art; however, considerable room for improvement remains.

BRIEF DESCRIPTION OF THE DRAWINGS

The novel features believed characteristic of the system are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 17 is a top, plan view of additional illustrative embodiments of an apparatus for attaching a member to a honeycomb core;

FIG. 18 is a cross-sectional view of another illustrative embodiment of FIG. 17, taken along the line 18-18 in FIG. 17;

FIG. 19 is a cross-sectional depiction of an illustrative implementation of the embodiment of FIG. 18;

Figure 1:
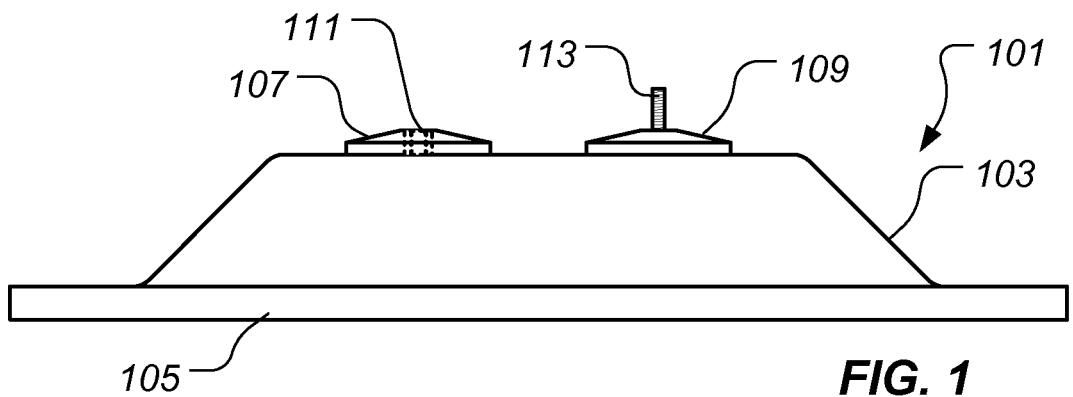
FIGS. 1-3 are illustrative depictions of conventional attachments of members to honeycomb core-stiffened structures.
Figure 2:
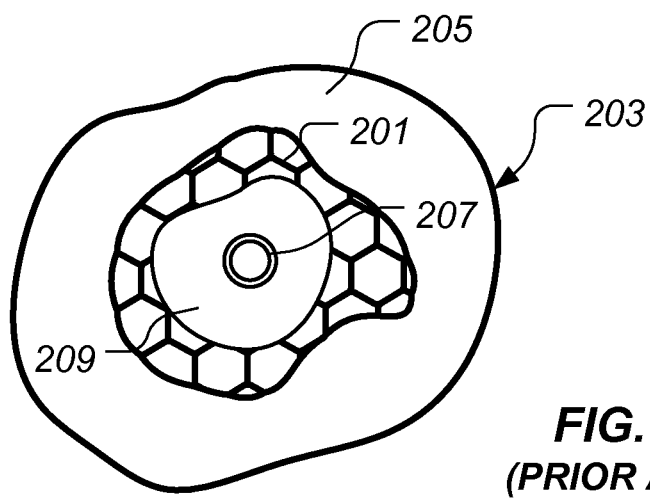
Figure 3:
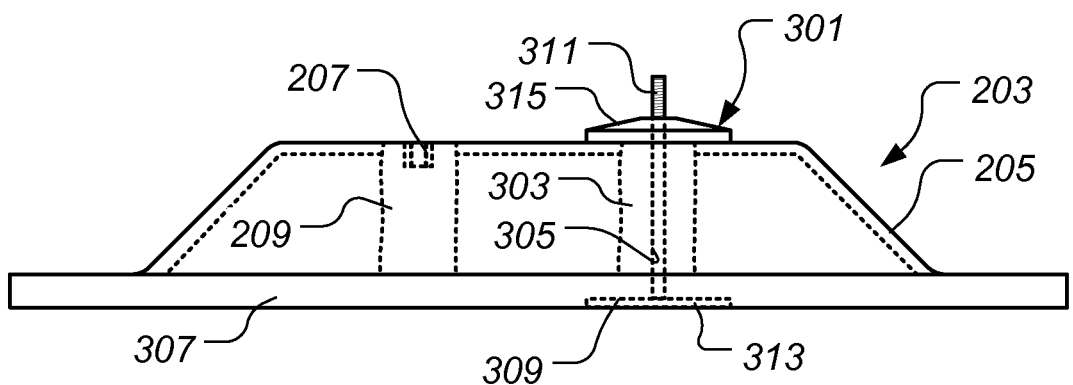

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the system as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system represents an apparatus and method for attaching members to honeycomb core-stiffened composite panels. For the purposes of this disclosure, the terms "honeycomb core" and "core" are used interchangeably and mean a core material comprising a plurality of interconnected cell walls that define a plurality of cells. While many honeycomb core materials define hexagonal cells, the scope of the present system encompasses core materials that define cells of other shapes, such as square, rectangular, octagonal, and the like. Further, the honeycomb core may be a tessellation of regular or irregular geometric cell shapes. Moreover, the term "large-celled honeycomb core" means, for the purposes of this disclosure, honeycomb core defining cells having a width dimension of more than about 7 mm. The apparatus is configured to be adhesively bonded to one or more cell walls of the core.

Figure 4:
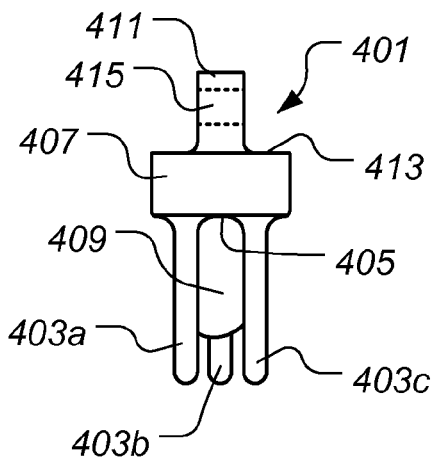
FIG. 4 is a side, elevational view of an illustrative embodiment of an apparatus for attaching a member to a honeycomb core.
Figure 5:
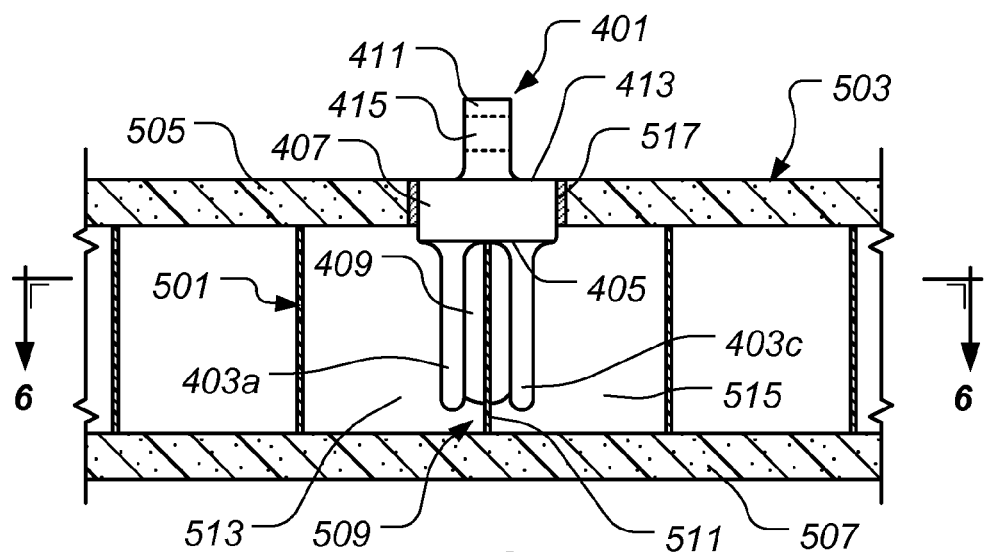
FIG. 5 is a partial cross-sectional view of an illustrative implementation of the apparatus of FIG. 4.
Figure 6:
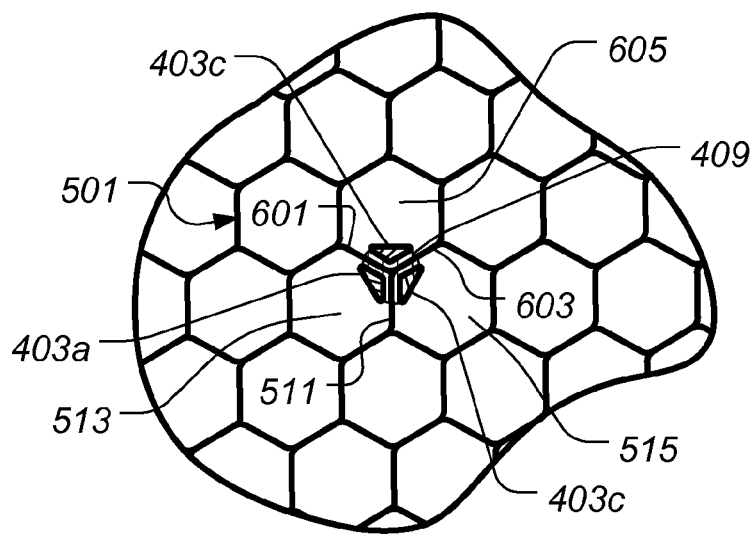
FIG. 6 is a top, plan view of an illustrative implementation of the apparatus of FIG. 4.

FIG. 4 depicts a first illustrative embodiment of an apparatus 401 for attaching a member (not shown) to a honeycomb core, such as a honeycomb core 501 of FIG. 5. FIG. 5 depicts a cross-sectional view of a honeycomb core-stiffened composite panel 503, including honeycomb core 501. Apparatus 401 is shown installed on panel 503 but apparatus 401 is not shown in cross-section. FIG. 6 depicts a top view of a portion of panel 503, further illustrating apparatus 401 adhesively bonded to honeycomb core 501.

Referring to FIG. 4, apparatus 401 comprises a plurality of tangs 403a-403c extending from a lower surface 405 of a body 407. The illustrated embodiment provides three tangs, i.e., tangs 403a-403c; however, the scope of the present system is not so limited. Rather, the number of tangs, e.g., tangs 403a-403c, included in apparatus 401 is implementation specific, as is discussed in greater detail herein. In the illustrated embodiment, apparatus 401 includes a portion 409 of adhesive disposed between tangs 403a-403c. In other embodiments, however, apparatus 401 omits adhesive portion 409. Nevertheless, in such an embodiment, an adhesive, such as the adhesive of adhesive portion 409, is used to adhesively bond apparatus 401 to a honeycomb core, such as honeycomb core 501. The adhesive may be applied to one or both of apparatus 401 and honeycomb core 501.

Still referring to FIG. 4, the illustrated embodiment of apparatus 401 further comprises a tab 411 extending from an upper surface 413 of body 407. In the illustrated embodiment, tab 411 defines an opening 415 by which a member (not shown) is attached to apparatus 401. In other embodiments, however, tab 411 may be replaced by another element configured to attach a member to apparatus 401, as is discussed in greater detail herein. Examples of such elements include a male-threaded rod, a female-threaded fitting, and the like.

Turning now to FIGS. 5 and 6, apparatus 401 is shown adhesively bonded to honeycomb core 501. Honeycomb core 501 is disposed between and is adhesively bonded to a first skin 505 and a second skin 507. Honeycomb core 501, first skin 505, and second skin 507 make up a honeycomb core-stiffened composite panel 503. In the implementation depicted in FIGS. 5 and 6, a portion of first skin 505 is removed to receive apparatus 401 and to particularly receive body 407. The illustrated embodiment of apparatus 401 is configured to be attached at a node 509 where walls 511, 601, and 603 of honeycomb core 501 intersect. One of the plurality of tangs 403a-403c is disposed in each of cells 513, 515, and 605 of honeycomb core 501. Preferably, body 407 is adhesively bonded to first skin 503 by an adhesive portion 515. Preferably, the hole through first skin 505 is measurably larger than the diameter of body 407 so that tangs 403a-403c locate apparatus 401 at node 509. As such, adhesive 517 is used to fill any void between body 407 and an interior of the hole in first skin 503.

Figure 7:
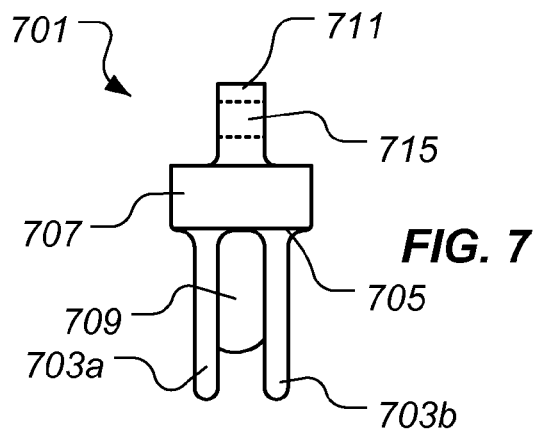
FIG. 7 is a side, elevational view of another illustrative embodiment of an apparatus for attaching a member to a honeycomb core.
Figure 8:
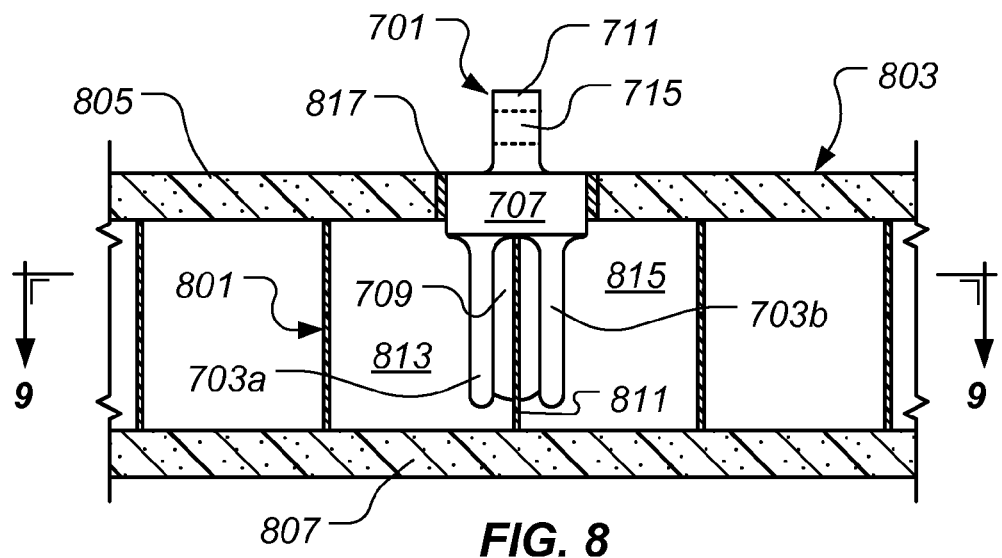
FIG. 8 is a is a partial cross-sectional view of an illustrative implementation of the apparatus of FIG. 7.
Figure 9:
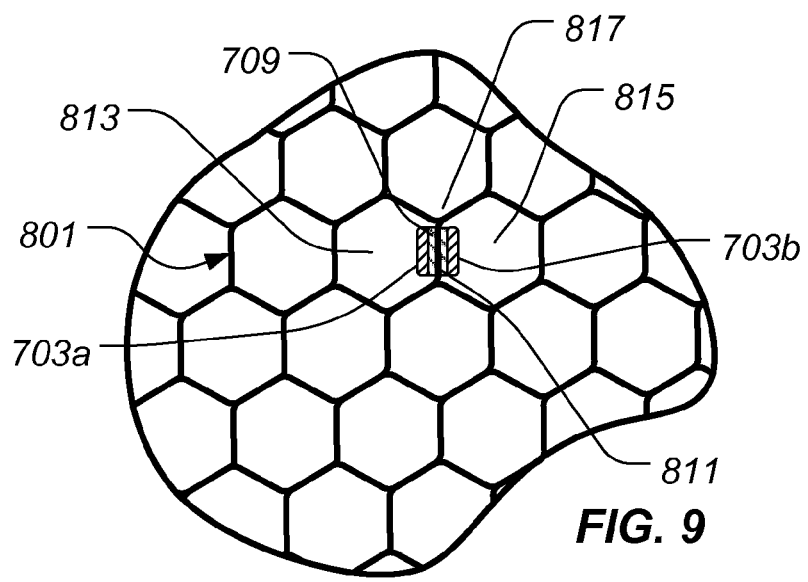
FIG. 9 is a top, plan view of an illustrative implementation of the apparatus of FIG. 7.

FIGS. 7-9 depict another illustrative embodiment of an apparatus 701 for attaching a member (not shown) to a honeycomb core, such as a honeycomb core 801 of FIG. 8. FIG. 8 depicts a cross-sectional view of a honeycomb core-stiffened composite panel 803, including honeycomb core 801. Apparatus 701 is shown installed on panel 803 but apparatus 701 is not shown in cross-section. FIG. 9 depicts a top view of a portion of panel 803, further illustrating apparatus 701 adhesively bonded to honeycomb core 801.

Referring to FIG. 7, apparatus 701 comprises two tangs 703a and 703b, rather than three tangs 403a-403c in the embodiment of FIGS. 4-6, extending from a lower surface 705 of a body 707. As discussed herein, the number of tangs, e.g., tangs 703a and 703b, included in apparatus 701 is implementation specific. In the illustrated embodiment, apparatus 701 includes a portion 709 of adhesive disposed between tangs 703a and 703b. In other embodiments, however, apparatus 701 omits adhesive portion 709. Nevertheless, in such an embodiment, an adhesive, such as the adhesive of adhesive portion 709, is used to adhesively bond apparatus 701 to a honeycomb core, such as honeycomb core 801. The adhesive may be applied to one or both of apparatus 701 and honeycomb core 801. Preferably, the adhesive, e.g., adhesive portion 709, used to bond apparatus 701 to honeycomb core 801 comprises a room temperature-curing adhesive, such as an epoxy adhesive or the like.

Still referring to FIG. 7, the illustrated embodiment of apparatus 701 further comprises a tab 711 extending from an upper surface 713 of body 707. In the illustrated embodiment, tab 711 defines an opening 715 by which a member (not shown) is attached to apparatus 701. In other embodiments, however, tab 711 may be replaced by another element configured to attach a member to apparatus 701, as is discussed in greater detail herein. Examples of such elements include a male-threaded rod, a female-threaded fitting, and the like.

Turning now to FIGS. 8 and 9, apparatus 701 is shown adhesively bonded to honeycomb core 801. Honeycomb core 801 is disposed between and is adhesively bonded to a first skin 805 and a second skin 807. Honeycomb core 801, first skin 805, and second skin 807 make up honeycomb core-stiffened composite panel 803. In the implementation depicted in FIGS. 8 and 9, a portion of first skin 805 is removed to receive apparatus 701 and to particularly receive body 707. The illustrated embodiment of apparatus 701 is configured to be attached to a wall 811 of honeycomb core 801. One of tangs 703a and 703b is disposed in each of cells 813 and 815 of honeycomb core 801. Preferably, body 707 is adhesively bonded to first skin 805 by an adhesive portion 817.

Figure 10:
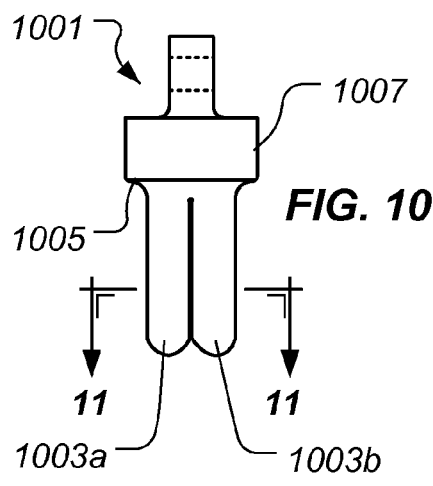
FIG. 10 is a side, elevational view of another illustrative embodiment of an apparatus for attaching a member to a honeycomb core.
Figure 11:
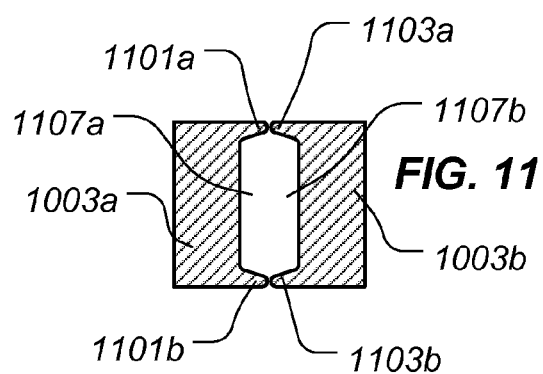
FIG. 11 is a cross-sectional view of the apparatus of FIG. 10, taken along the line 11-11 in FIG. 10.

In some implementations, it is desirable for the apparatus to grip one or more walls of the honeycomb core or to control the flow of adhesive that is used to bond the apparatus to the honeycomb core. Accordingly, FIG. 10 depicts another illustrative embodiment of an apparatus 1001 for attaching a member (not shown) to a honeycomb core, such as a honeycomb core 801 of FIG. 8. As in the embodiment of FIG. 7, apparatus 1001 comprises two tangs 1003a and 1003b extending from a lower surface 1005 of a body 1007. As shown in FIG. 11, however, tang 1003a includes inwardly-extending protrusions 1101a and 1101b, while tang 1003b includes inwardly-extending protrusions 1103a and 1103b, which grip a wall of a honeycomb core, such as wall 811 of honeycomb core 801. Moreover, protrusions 1101a-1101d define spaces 1107a and 1107b in which an adhesive portion such as adhesive portion 817, is disposed. When installed on a honeycomb core, protrusions 1101a-1101d abut a wall of the honeycomb core and provide a consistent thickness of adhesive between apparatus 1001 and wall 811 of the honeycomb core.

Figure 12:
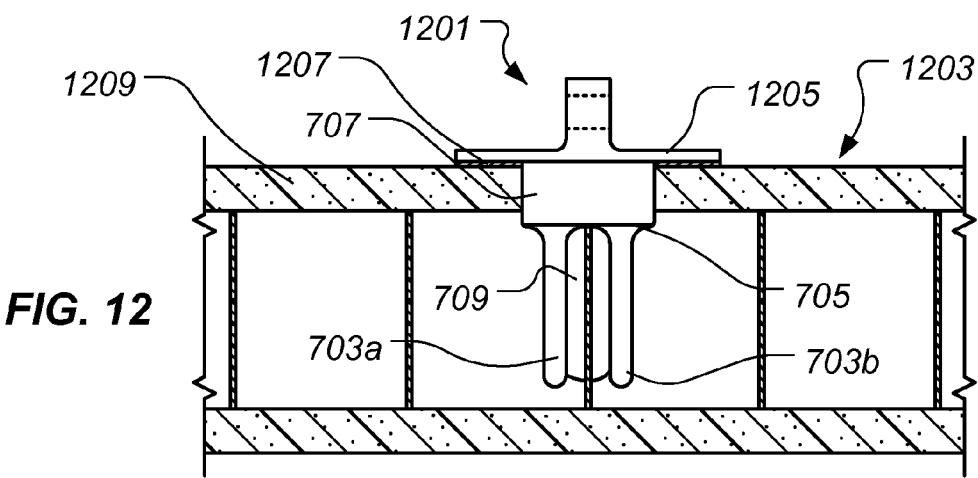
FIG. 12 is a partial cross-sectional view of another illustrative embodiment of an apparatus for attaching a member to a honeycomb core in an exemplary implementation.

In some implementations, the forces imparted on an attachment apparatus by a member attached thereto may be significant. Accordingly, FIG. 12 depicts another illustrative embodiment of an apparatus 1201 for attaching a member (not shown) to a honeycomb core-stiffened structure 1203. The features of apparatus 1201 generally correspond to the features of apparatus 701, except a flange 1205 extends outwardly from body 707. In use, a portion of adhesive 1207 adhesively bonds flange 1205 to first skin 1209. The adhesive contact between flange 1205 and first skin 1209 provides shear strength such that a shear load on apparatus 1201 is transferred to first skin 1209 via adhesive 1207.

Figure 13A:
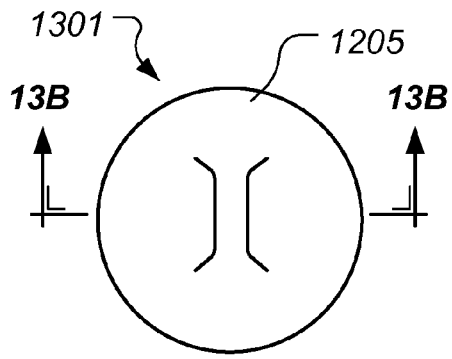
FIG. 13*a* is a top, plan view of another illustrative embodiment of an apparatus for attaching a member to a honeycomb core.
Figure 13B:
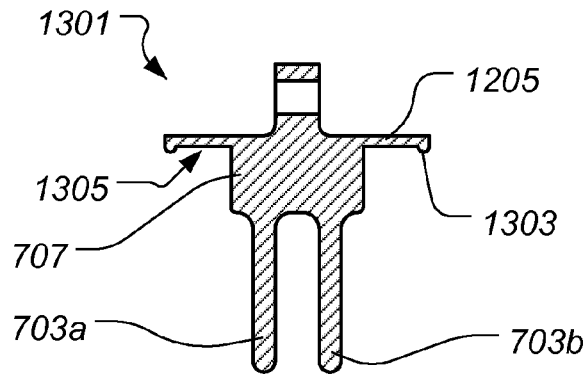
FIG. 13*b* is a cross-sectional view of the apparatus of FIG. 13*a*, taken along the line 14-14 in FIG. 13.

In some implementations, controlling a thickness of adhesive portion 1207 used to bond flange 1205 to a first skin 1209 of honeycomb core-stiffened structure 1203 is desirable. Accordingly, FIGS. 13a and 13b depict a fifth illustrative embodiment of an apparatus 1301 for attaching a member (not shown) to honeycomb core-stiffened structure 1203. FIG. 13A is a top, plan view of apparatus 1301, while FIG. 13B is a cross-sectional view of apparatus 1301, taken along the line 13B-13B in FIG. 13A. The features of apparatus 1301 generally correspond to the features of apparatus 1201, except a rim 1303 extends downwardly from flange 1205, defining a recess 1305 in which an adhesive portion is disposed. Rim 1303 may be a continuous rim below flange 1205 as well as individual tabs which periodically protrude below flange 1205. In use, rim 1303 abuts first skin 1209 to control a thickness of an adhesive portion, similar to adhesive portion 1207, which adhesively bonds flange 1205 to first skin 1209.

Figure 14:
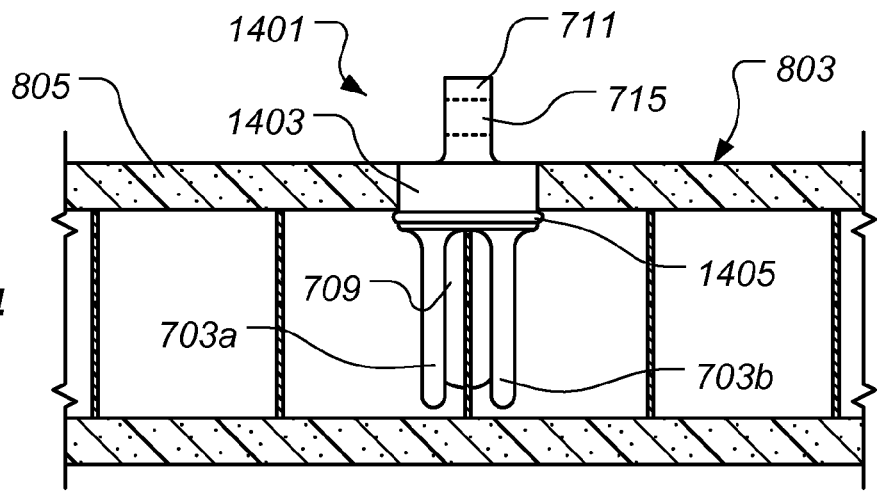
FIG. 14 is a partial cross-sectional view of another illustrative embodiment of an apparatus for attaching a member to a honeycomb core in an exemplary implementation.

FIG. 14 depicts another illustrative embodiment of an apparatus 1401 for attaching a member (not shown) to honeycomb core-stiffened structure 803. In the illustrated embodiment, features of apparatus 1401 generally correspond to the features of apparatus 701 (shown in FIG. 7), except that apparatus 1401 includes a body 1403 that is configured to retain a sealing element 1405, such as an O-ring. Sealing element 1403 inhibits a fluid from passing between first skin 805 and apparatus 1401. In another embodiment, apparatus 1401 has a female, threaded fitting, such as threaded fitting 1509 illustrated in FIG. 15.

Figure 15:
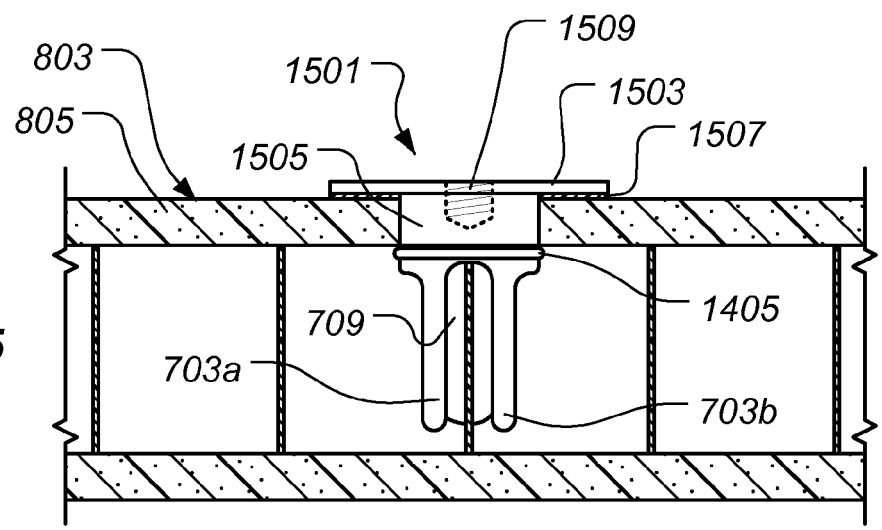
FIG. 15 is a partial cross-sectional view of another illustrative embodiment of an apparatus for attaching a member to a honeycomb core in an exemplary implementation.

FIG. 15 depicts another illustrative embodiment of an apparatus 1501 for attaching a member (not shown) to honeycomb core-stiffened structure 803. In the illustrated embodiment, features of apparatus 1501 generally correspond to the features of apparatus 1401 of FIG. 14, except that apparatus 1501 includes a flange 1503 that extends from a body 1505. In use, a portion of adhesive 1507 adhesively bonds flange 1503 to first skin 805. Moreover, body 1505 defines a female, threaded fitting 1509 used to attach the member to apparatus 1501, which is provided instead of a tab 711 of apparatus 1401.

Figure 16A:
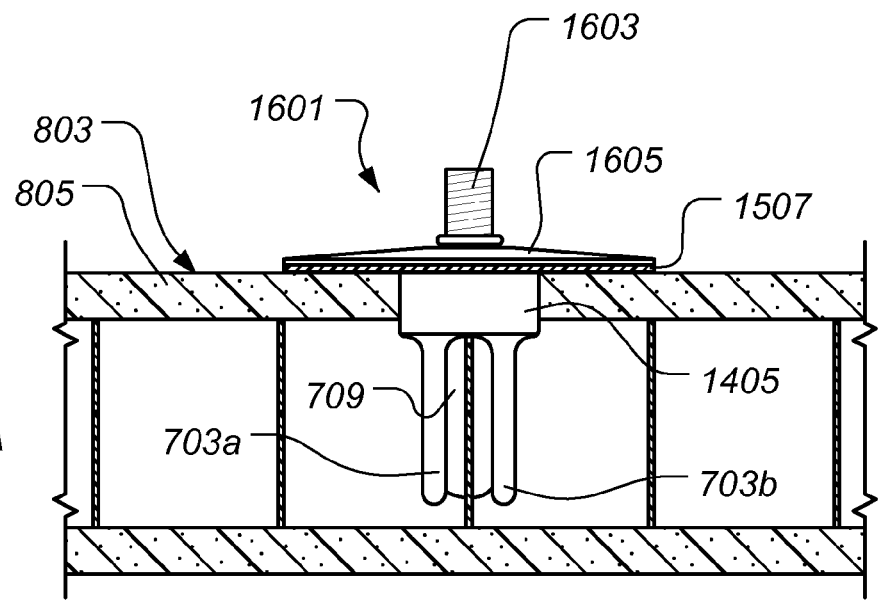
FIG. 16A is a partial cross-sectional view of another illustrative embodiment of an apparatus for attaching a member to a honeycomb core in an exemplary implementation.

FIG. 16A depicts another illustrative embodiment of an apparatus 1601 for attaching a member (not shown) to honeycomb core-stiffened structure 803. In the illustrated embodiment, features of apparatus 1601 generally correspond to the features of apparatus 1501, except that apparatus 1601 provides a male, threaded fitting 1603 extending from a flange 1605 for attaching the member to apparatus 1601. In the embodiment of apparatus 1601, flange 1605 is integral to body 1405.

Figure 16B:
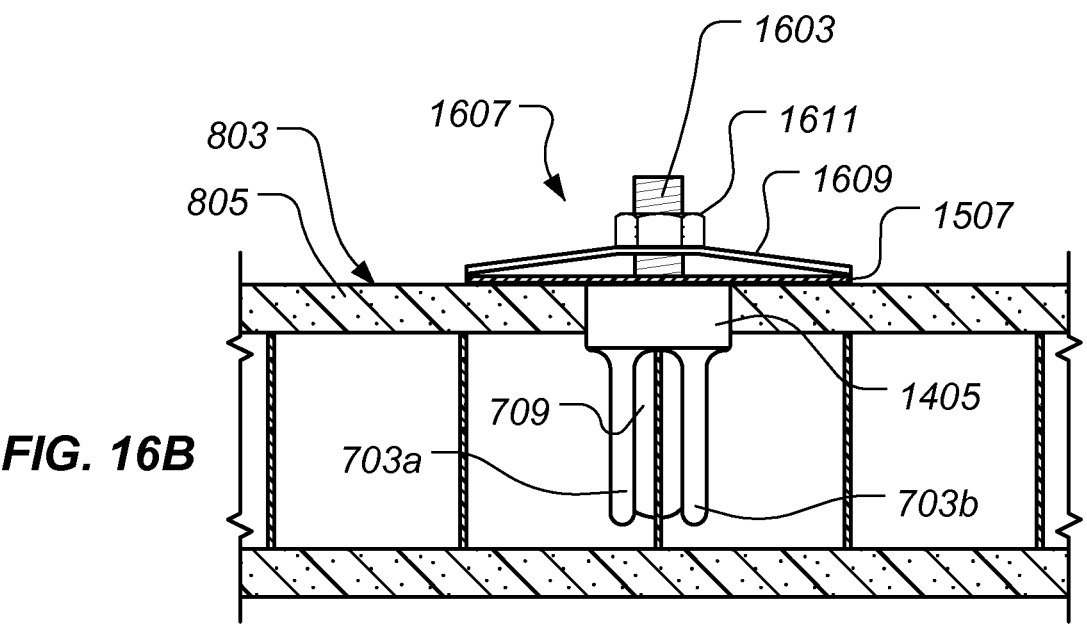
FIGS. 16B and 16C are partial cross-sectional views of another illustrative embodiment of an apparatus for attaching a member to a honeycomb core in an exemplary implementation.
Figure 16C:
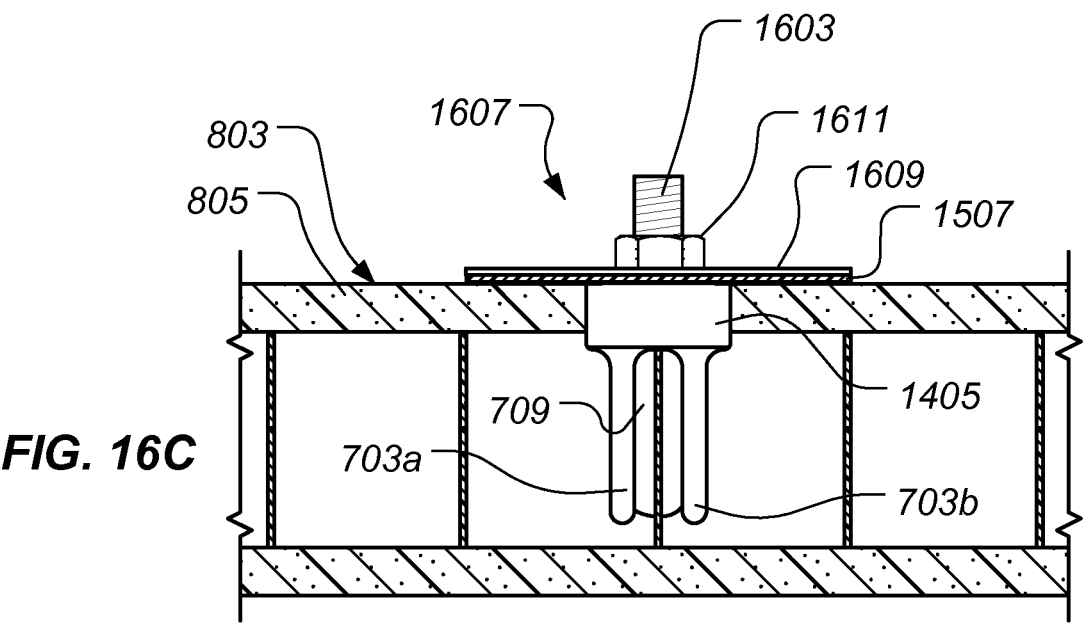

FIGS. 16B and 16C depict another illustrative embodiment of an apparatus 1607 for attaching a member (not shown) to honeycomb core-stiffened structure 803. In the illustrated embodiment, features of apparatus 1607 generally correspond to the features of apparatus 1601, except that apparatus 1607 provides a washer 1609 that is not integral to body 1405. Moreover, washer 1609 is partially conically shaped in order to produce preload, especially to the periphery, when a nut 1609 is engaged on male-threaded fitting 1603 to a certain torque. FIG. 16B illustrates apparatus 1607 with nut 1611 in an un-torqued state, with washer 1609 in its natural shape. In contrast, FIG. 16C illustrates apparatus 1607 with nut 1611 in a torqued state, thereby elastically compressing washer 1609 to a relatively flat position. A member is then attached to the remaining portion of fitting 1603. The compression of washer 1609 serves several purposes. Firstly, compression of washer 1609 provides preload between washer 1609 and first skin 805. Some structural loads upon apparatus 1607 may promote a failure that would first occur in a separation between the outer periphery of washer 1609 and first skin 805 in adhesive layer 1507, which may also be referred to as "peel off." The preload between washer 1609 and first skin acts to prevent "peel off." Secondly, washer 1609 functions as a visual indicator that the adhesive bond between apparatus 1607 and honeycomb core-stiffened structure 803 as at least partially failed. For example, if washer 1609 were to return to its original conical shape after installation, an inspector (or the like) would be able to ascertain that an adhesive bond between apparatus 1607 and honeycomb core-stiffened structure 803 has a least partially failed. In an alternative embodiment of apparatus 1607, washer 1609 is integral with body 1405. In such an embodiment, washer 1609 is preloaded and held in position while adhesive 709 and 1507 cure.

FIGS. 17-19 depict another illustrative embodiment of an apparatus 1701 for attaching a member (not shown) to a honeycomb core-stiffened structure 1703. In the illustrated embodiment, apparatus 1701 is disposed within a cell 1705 of a honeycomb core 1707 when in use. Apparatus 1701 comprises a plurality of tangs 1709a-1709c extending from a cap 1711. In the illustrated embodiment, the plurality of tangs comprises three tangs, i.e., tangs 1709a-1709c, rotationally spaced apart by about 120 degrees. The scope of the present system, however, is not so limited. In various implementations, apparatus 1701 may comprise other quantities of tangs, such as four, six, or eight tangs. A hole 1715 in a first skin 1717 is preferably smaller than the diameter of cell 1705. A discussed further herein, each tang 1709a-1709c is preferably elastic so that each tang 1709a-1709c elastically flexes inward when inserted into hole 1715. While cap 1711 may be operably associated with a wide variety of fittings, cap 1711 is operably associated with a female, threaded fitting 1713 in the illustrated embodiment for attaching the member to apparatus 1701. It should be appreciated that threaded fitting 1713 may be a variety of attachment means. Referring to FIG. 19, apparatus 1701 is disposed within cell 1705 and an adhesive 1901 is disposed between each tang 1709a-1709c and a wall, such as a wall 1903, of honeycomb core 1707 to adhesively bond apparatus 1701 to honeycomb core 1707. Adhesive 1901 may be applied in a variety of methods, for example, adhesive 1901 may be pre-applied prior to inserting apparatus 1701. Alternatively, adhesive 1901 may be applied or injected after apparatus 1701 is in position. Furthermore, a mandrel or inflatable balloon may be used to prevent adhesive 1901 from migrating into the interior of apparatus 1701, or to transfer adhesive 1901 between tang 1709a-1709c and wall 1903. The mandrel or inflatable balloon may also be used to apply positive pressure and squeeze adhesive between tang 1709a-1709c and wall 1903.

Figure 20:
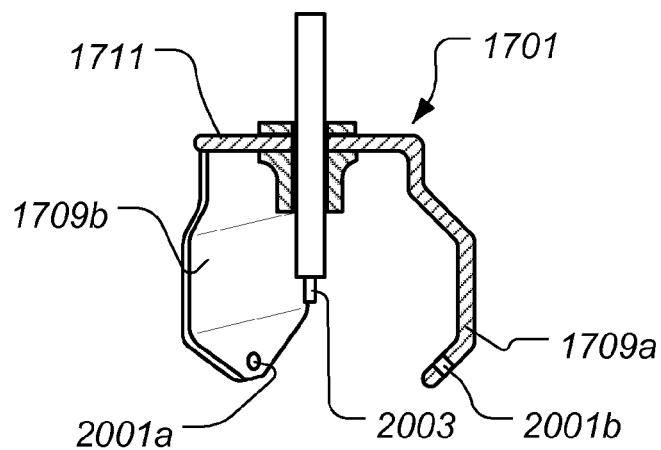
FIG. 20 is a cross-sectional view of an illustrative embodiment alternative to that of FIG. 18.

As shown in FIG. 20, in one embodiment, each tang 1709a-1709c defines an opening, such as openings 2001a and 2001b. To aid in installing apparatus 1701 in cell 1705, tangs 1709a-1709c are flexed such that an installation tool 2003 is received in each opening. After apparatus 1701 is placed in cell 1705, installation tool 2003 is removed, allowing tangs 1709a-1709c to become deflexed and return to generally their original positions. It should be appreciated that even though apparatus 1701 is described with regard to three tangs 1709a-1709c, other embodiments may have fewer or greater tangs. For example, apparatus 1701 may have two or four tangs when honeycomb has square shaped cells. Furthermore, tangs 1709a-1709c may be configured to be twist-locked together such that the tangs 1709a-1709c release from each upon a twisting force. In another embodiment, tangs 1709a-1709c flexed and held together with an integral locking feature on each tang; when the apparatus is installed, a tool is inserted which releases the tangs 1709a-1709c into a deflexed position.

Figure 21:
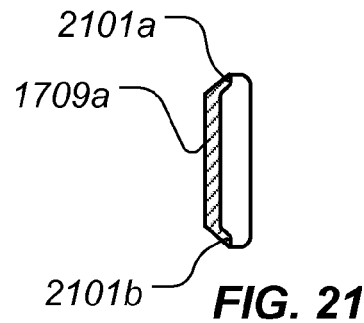
FIG. 21 is a cross-sectional view of a portion of the embodiment of FIGS. 18 and 20, taken along the line 21-21 in FIG. 18.

In one embodiment, shown in FIG. 21, tang 1709a includes outwardly-extending protrusions 2101a and 2101b, which grip a wall of a honeycomb core, such as wall 1903, of honeycomb core 1707. Tangs 1709b and 1709c include corresponding protrusions. Moreover, protrusions 2101a and 2101b define spaces in which an adhesive portion, such as adhesive portion 1901, is disposed between each tang 1709a-1709c and corresponding walls of honeycomb core 1707. When installed on a honeycomb core, protrusions 2101a and 2101b abut a wall of the honeycomb core and provide a consistent thickness of adhesive between apparatus 1701 and wall 1903 of the honeycomb core.

Figure 22:
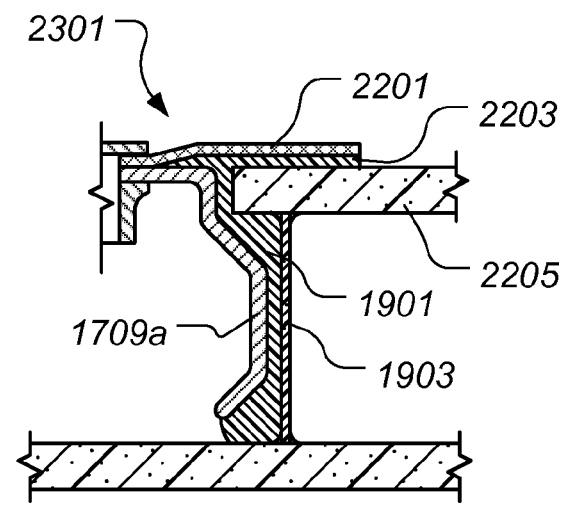
FIG. 22 is a cross-sectional depiction of an illustrative embodiment alternative to that of FIG. 18, showing an exemplary implementation of the illustrative embodiment.

In some embodiments, such as the embodiment shown in FIG. 22, a flange 2201 extends outwardly from cap 1711. In use, a portion of adhesive 2203 adhesively bonds flange 2201 to a first skin 2205.

Figure 23:
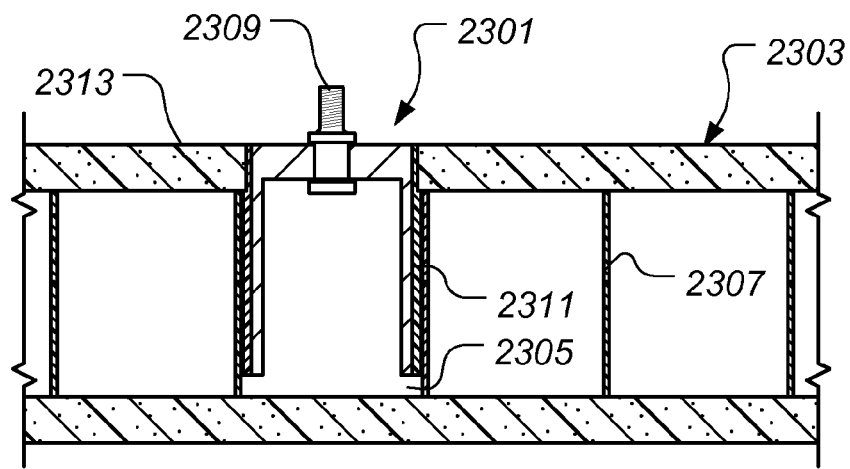
FIG. 23 is a cross-sectional view of another illustrative embodiment, taken along the line 23-23 in FIG. 17.

FIG. 23 depicts another illustrative embodiment of an apparatus 2301 for attaching a member (not shown) to a honeycomb core-stiffened structure 2303. In the illustrated embodiment, apparatus 2301 is disposed within a cell 2305 of a honeycomb core 2307 when in use. While apparatus may be operably associated with a wide variety of fittings, apparatus 2301 comprises a male, threaded fitting 2309 in a hole in the illustrated embodiment for attaching the member to apparatus 2301. Disposed within cell 2305, apparatus 2301 is adhesively bonded to honeycomb core 2307 by an adhesive 2311. A mandrel or inflatable balloon may also be used to evacuate adhesive 2311 from internal cavity and distribute adhesive 2311 from the internal cavity and distribute adhesive 2311 between apparatus 2301 and the walls of cell 2305. It should be appreciated that apparatus 2301 may also include a flange adhesively bonded to a first skin 2313 of structure 2303, similar to flange 1205 shown in FIG. 12. It should also be appreciated that core 2307 may be foam core.

Figure 24:
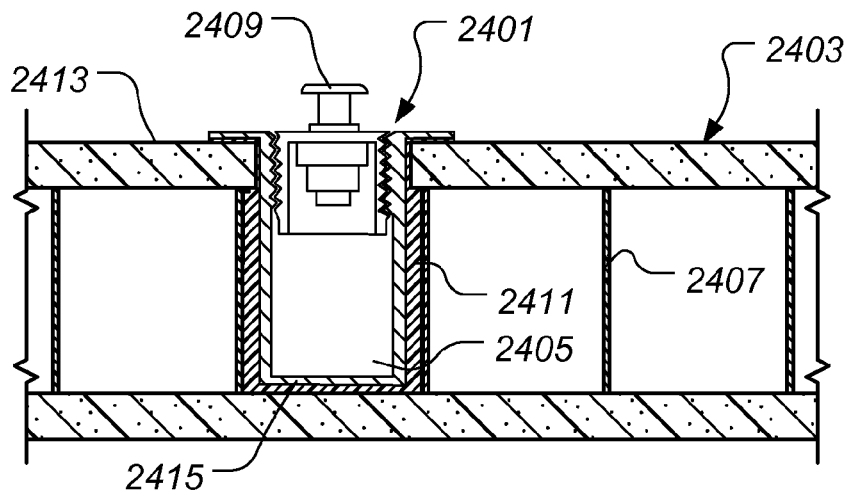
FIG. 24 is a cross-sectional view of another illustrative embodiment, taken along the line 23-23 in FIG. 17.

FIG. 24 depicts another illustrative embodiment of an apparatus 2401 for attaching a member (not shown) to a honeycomb core-stiffened structure 2403. In the illustrated embodiment, apparatus 2401 includes a housing 2415 disposed within a cell 2405 of a honeycomb core 2407, when in use. In an alternative embodiment, apparatus 2401 includes a housing 2415 disposed within multiple cells of a polgon core. While apparatus may be operably associated with a wide variety of fittings, apparatus 2401 comprises a button type fitting 2409 which is threadingly engaged with housing 2415 in the illustrated embodiment for attaching the member to apparatus 2401. Disposed within cell 2405, housing 2415 is adhesively bonded to honeycomb core 2407 by an adhesive 2411. The body of housing 2415 may take on a wide variety of shapes, such as cylindrical, or shaped to match the shape of cell 2405 of core 2407, such as a hexagon shape. It should be appreciated that apparatus 2401 may also include a flange, as shown, adhesively bonded to a first skin 2413 of structure 2403. In one configuration, fitting 2409 is capable of be selectively recessed such that a top surface of fitting 2409 is approximately flush with first skin 2413. In another configuration, fitting 2409 is threadingly engaged deeper into housing 2415 such that the top surface of fitting 2409 is approximately flush with first skin 2413. It should also be appreciated that core 2407 may be foam core.

Figure 25:
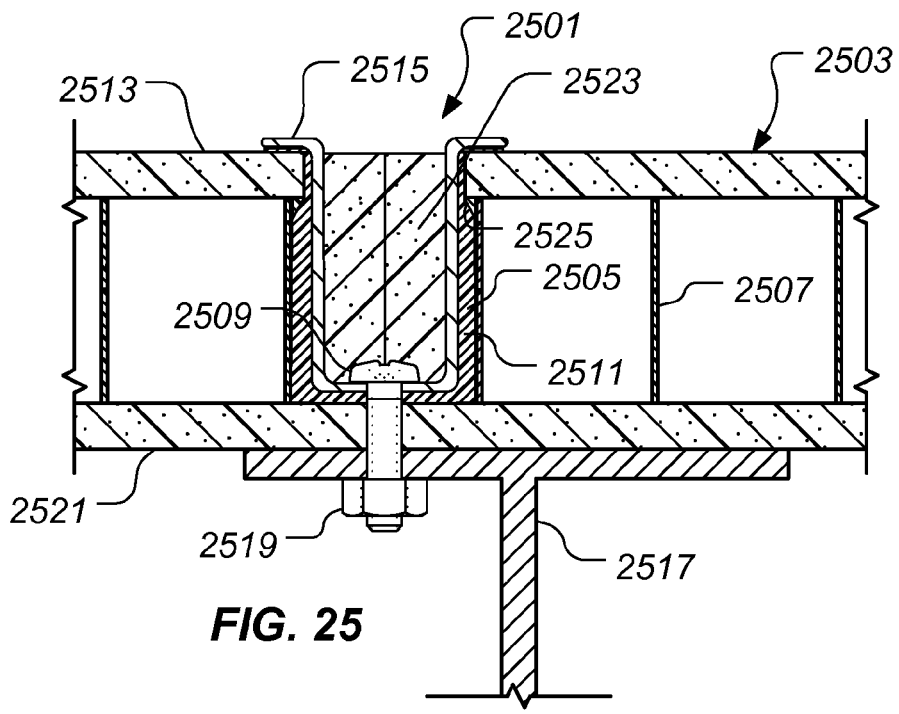
FIG. 25 is a cross-sectional view of another illustrative embodiment, taken along the line 25-25 in FIG. 17.

FIG. 25 depicts another illustrative embodiment of an apparatus 2501 for attaching a member 2517 to a honeycomb core-stiffened structure 2503. In the illustrated embodiment, apparatus 2501 includes a housing 2515 disposed within a cell 2505 of a honeycomb core 2507, when in use. Disposed within cell 2505, housing 2515 is adhesively bonded to honeycomb core 2507 by an adhesive 2511. Housing 2515 may also be used as a replacement for cell 2505, such that cell 2505 may be wholly or partially removed from core 2507 with housing 2515 being bonded between flange 2515 and first skin 2513, as well as between housing 2515 and second skin

2521. Adhesive 2511 may alternatively be a structural filler that is installed while viscous, but then hardens to become a hard structural filler. During installation, adhesive 2511 may be installed in cell 2505. Next, housing 2515 may be pressed into cell 2505, thereby displacing adhesive 2511 until housing 2515 is in the desired position. In such a manner, housing 2515 may introduce a compressive load into structure 2503 by bearing a load out and reinforcing cell 2505 without a fitting or fastener. A fastener 2509 and nut 2519 are used to mechanically couple structure 2503 to member 2517. Housing 2515 facilitates load transfer between structure 2503 and member 2517 through bonding contact between housing 2515, a second skin 2521, cell 2505, and first skin 2513. The body of housing 2515 may take on a wide variety of shapes, such as cylindrical, or shaped to match the shape of cell 2505 of core 2507, such as a hexagon shape. It should be appreciated that apparatus 2501 may also include a flange, as shown, adhesively bonded to a first skin 2513 of structure 2503. An optional memory foam filler 2523, or the like, may be used to keep contaminants, such as liquid or particulate contaminants, from entering the cavity created by housing 2515. It should be appreciated that even though memory foam filler 2523 is depicted as completely filling the cavity created by housing 2515, alternative embodiments may include memory foam filler 2513 only partially filling the cavity created by housing 2515. Further, an optional slit in memory foam filler 2523 may be used to allow for convenient access to fastener 2509 with a tool, such a screwdriver, allen wrench, or the like. The slit would preferably be aligned along the same axis as fastener 2509, such that memory foam filler 2523 would also serve to align the tool (not shown) as it is inserted into foam filler 2523 to engage fastener 2509. The slit facilitates blind engagement of the tool with fastener 2509. Memory foam filler 2523 also acts to retain fastener 2509 should fastener 2509 become disengaged from nut 2519, which increases the choices of fastener type because fastener 2509 may not have to be a self-locking or self-retaining type. It should also be appreciated that core 2507 may alternatively be a foam core.

Figure 26:
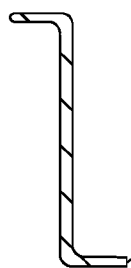
FIGS. 26 and 27 are cross-sectional views of alternative embodiments of the housing shown in FIG. 25.

Referring to FIG. 26, an alternative embodiment of a housing 2615, used in apparatus 2501, is illustrated. Housing 2615 includes a hole 2625. During installation, housing 2615 is positioned within cell 2505, then adhesive 2511 is injected through hole 2625 in order to create a bond between housing 2615, second skin 2521, cell 2505, and first skin 2513. Hole 2625 may also be used as a pilot hole to aid in drilling a through hole for fastener 2519. Furthermore, hole 2625 may be full sized in relation to fastener 2509.

Figure 27:
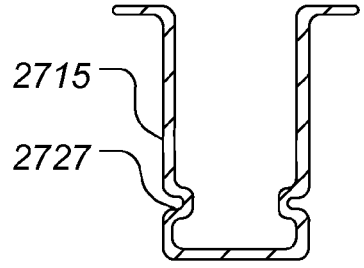

Referring to FIG. 27, an alternative embodiment of a housing 2715, used in apparatus 2501, is illustrated. Housing 2715 includes an indentation 2727 for creating a mechanical lock between housing 2715 and structure 2503. Housing 2715 is particularly well suited for when adhesive 2511 is a structural filler. As such, indentation 2727 may be any contour change in housing 2715 that facilitates at least partial entrapment of the structural filler so that a mechanical lock is created between housing 2715 and structure 2503. A mechanical lock can be created between housing 2715 and edge of first skin 2513, the edge overhanging the wall of cell 2505. Further, a mechanical lock can be created between housing 2715 and an adhesive fillet 2525, the adhesive fillet 2525 being used to bond first skin 2513 to core 2507. An adhesive bulb cured at the edge of the first skin 2503, without a first skin 2513 being attached, may also serve as a mechanical lock feature.

It should be noted that the embodiments disclosed herein are merely examples of the myriad of embodiments contemplated by the present system. For example, any embodiment may include various types of fittings for attaching a member to the subject apparatus, may include flanges or omit flanges for adhesively attaching the subject apparatus to a skin of a honeycomb core-stiffened structure, may include or omit protrusions extending from tangs, and the like.

The system provides significant advantages, including: (1) providing a lightweight means for attaching members to honeycomb core-stiffened structures; (2) providing a reliable means for transferring loads from a member attached to a honeycomb core-stiffened structure to the structure; and (3) providing a means for regulating a thickness of adhesive used to bond an apparatus for attaching a member to a core-stiffened structure.

The particular embodiments disclosed above are illustrative only, as the system may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the system. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. An apparatus for attaching a member to a honeycomb core-stiffened structure, comprising:
   a body disposed partially within the honeycomb core-stiffened structure;
   one or more elements extending from the body configured to be bonded to one or more walls of a honeycomb core of the honeycomb core-stiffened structure, the one or more elements including a plurality of tangs between which the one or more walls of the honeycomb are disposed when the apparatus is in use; and
   a fitting disposed outside the honeycomb core-stiffened structure for attaching the member to the apparatus;
   wherein portions of the tangs in contact with the one or more walls of the honeycomb core are parallel to the one or more walls of the honeycomb core; and
   wherein the body, the one or more elements, and the fitting are a single integral and gaplessly continuous piece.

2. The apparatus of claim 1, wherein the plurality of tangs includes three tangs and the apparatus is disposed at an intersection of walls of the honeycomb core when in use;
   wherein a center of the three tangs is disposed at the intersection of walls of the honeycomb core.

3. The apparatus of claim 1, wherein the plurality of tangs includes two tangs and a wall of the honeycomb core is received between the two tangs.

4. The apparatus of claim 1, wherein each of the plurality of tangs defines a plurality of smooth protrusions configured to grip a wall of the one or more walls of the honeycomb core.

5. The apparatus of claim 1, wherein each of the plurality of tangs defines a plurality of protrusions for regulating a thickness of adhesive when the apparatus is in use; and
   wherein the adhesive is located inwardly from the plurality of tangs.

6. The apparatus of claim 1:
   wherein the one or more elements extending from the body comprise:
      a plurality of tangs rotationally spaced apart extending from the body and configured to be disposed proximate a corresponding plurality of walls defining the cell of the honeycomb core.

7. The apparatus of claim 6, wherein each of the plurality of tangs defines an opening in which an insertion tool is received.

8. The apparatus of claim 6, wherein each of the plurality of tangs defines a plurality of protrusions configured to grip a wall of the one or more walls of the honeycomb core.

9. The apparatus of claim 6, wherein each of the plurality of tangs defines a plurality of protrusions for regulating a thickness of adhesive when the apparatus is in use.

10. The apparatus of claim 1, further comprising:
a flange extending from the body, configured to be adhesively bonded to a first skin of the honeycomb core-stiffened structure.

11. The apparatus of claim 1, further comprising:
a washer configured to provide a preload against a first skin of the honeycomb upon compression, the washer located in contact with the first skin of the honeycomb core-stiffened structure.

\* \* \* \* \*